(12) United States Patent
Blessing et al.

(10) Patent No.: US 9,120,481 B2
(45) Date of Patent: Sep. 1, 2015

(54) METHOD FOR CONTROLLING A HYBRID DRIVETRAIN

(71) Applicant: GETRAG Getriebe-und Zahnradfabrik Hermann Hagenmeyer GmbH & Cie KG, Untergruppenbach (DE)

(72) Inventors: Uli Christian Blessing, Heilbronn (DE); Thomas Hoffmeister, Korntal-Munchingen (DE); Ingo Matusche, Untergruppenbach (DE); Thorsten Stepper, Waldenburg (DE); Philipp Knopfle, Ludwigsburg (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 14/024,487

(22) Filed: Sep. 11, 2013

(65) Prior Publication Data

US 2014/0073480 A1 Mar. 13, 2014

(30) Foreign Application Priority Data

Sep. 12, 2012 (DE) .......................... 10 2012 018 416

(51) Int. Cl.
*B60W 10/08* (2006.01)
*B60W 20/00* (2006.01)
(Continued)

(52) U.S. Cl.
CPC .................. *B60W 20/10* (2013.01); *B60K 6/48* (2013.01); *B60W 10/06* (2013.01); *B60W 10/08* (2013.01); *B60W 10/113* (2013.01); *B60W 20/40* (2013.01); *B60W 30/19* (2013.01); *B60W 30/192* (2013.01); *F02N 11/006* (2013.01);
(Continued)

(58) Field of Classification Search
None
See application file for complete search history.

(56) References Cited

U.S. PATENT DOCUMENTS 7,464,616 B2* 12/2008 Leibbrandt et al. ............. 74/331
2010/0263952 A1* 10/2010 Richter et al. ........... 180/65.275
(Continued)

FOREIGN PATENT DOCUMENTS

DE 10 2010 044 618 A1 3/2012
WO WO 2007042109 A1 * 4/2007
WO WO 2011048102 A1 * 4/2011

OTHER PUBLICATIONS

Machine translation of WO 2007042109 A1.*
(Continued)

*Primary Examiner* — Dirk Wright
(74) *Attorney, Agent, or Firm* — Knobbe, Martens, Olson & Bear, LLP

(57) ABSTRACT

Method for controlling a hybrid drivetrain which has a drive engine and a dual-clutch gearbox which, to establish two power transmission paths, has a first and a second friction clutch and a first and a second component gearbox. An electric machine is connected to the second power transmission path downstream of the second friction clutch in the power flow direction. Purely electric driving operation can be realized by means of the second component gearbox assigned to the second friction clutch. In the event of a gear change in the second component gearbox during purely electric driving operation, a fill-in torque is provided. The fill-in torque is provided from inertial energy of the previously cranked, non-fired drive engine, wherein the drivetrain also has an electric starter motor, and wherein the starter motor is used to crank the drive engine.

8 Claims, 9 Drawing Sheets

(51) Int. Cl.
*B60K 6/48* (2007.10)
*B60W 10/06* (2006.01)
*B60W 10/113* (2012.01)
*B60W 30/19* (2012.01)
*B60W 30/192* (2012.01)
*F02N 11/00* (2006.01)
*F02N 15/02* (2006.01)

(52) U.S. Cl.
CPC ...... *B60K 2006/4825* (2013.01); *F02N 15/022* (2013.01); *Y02T 10/6221* (2013.01); *Y02T 10/6252* (2013.01); *Y02T 10/6286* (2013.01); *Y10S 903/902* (2013.01); *Y10T 477/26* (2015.01)

(56) References Cited

U.S. PATENT DOCUMENTS

| | | | |
|---|---|---|---|
| 2011/0168469 A1* | 7/2011 | Hansson | 180/65.275 |
| 2012/0262105 A1* | 10/2012 | Atkins | 320/103 |
| 2013/0042617 A1* | 2/2013 | Atkins et al. | 60/698 |
| 2013/0172140 A1* | 7/2013 | Potter | 475/5 |
| 2013/0288850 A1* | 10/2013 | Kaltenbach | 477/5 |
| 2014/0195089 A1* | 7/2014 | Kobayashi et al. | 701/22 |

OTHER PUBLICATIONS

Machine translation of DE 10 2010 044 618.*

* cited by examiner

METHOD FOR CONTROLLING A HYBRID DRIVETRAIN

CROSS REFERENCES TO RELATED APPLICATIONS

This application claims the priority of German patent application DE 10 2012 018 416.6 filed Sep. 12, 2012.

BACKGROUND

The present invention relates to a method for controlling a hybrid drivetrain which has a drive engine and a dual-clutch gearbox which, to establish two power transmission paths, has a first and a second friction clutch and a first and a second component gearbox, wherein an electric machine is connected or can be connected to the second power transmission path downstream of the second friction clutch in the power flow direction, wherein purely electric driving operation can be realized by means of the second component gearbox assigned to the second friction clutch, and wherein, in the event of a gear change in the second component gearbox during purely electric driving operation, a fill-in torque is provided.

Dual-clutch gearboxes of the described type are generally known. Through the provision of two power transmission paths, it is possible to perform gear changes without an interruption in traction force. Here, the drive torque provided by the drive engine is transferred from one power transmission path to the other without an interruption in traction force by means of overlapping actuation. Said type of control of a dual-clutch gearbox is known in particular in the case of drivetrains whose drive engine is an internal combustion engine.

It is also known for drivetrains of motor vehicles to be hybridised. This generally includes the provision of at least one electric machine, which can generally operate as an electric motor or as an electrical generator. In the operating mode as an electric machine, additional drive torque can be provided. In the operating mode as an electrical generator, the electric machine can operate in a recuperative manner in order to obtain, for example during a braking process, electrical energy for charging an energy store.

In general, in drivetrains of said type, it is known for an electric machine to be arranged between the drive engine and the dual-clutch gearbox, that is to say upstream of the friction clutches of the dual-clutch gearbox in the power flow direction.

In the case of the hybrid drivetrain mentioned in the introduction, however, the electric machine is, within the dual-clutch gearbox, connected at least intermittently to an input of one of the component gearboxes, that is to say downstream of the associated friction clutch (in the present case of the second friction clutch) in the power flow direction. In this way, a summing point of the drive engine and electric machine is situated not upstream of the input of the dual-clutch gearbox but rather in the gearbox. In this way, the shift sequences of a conventional dual-clutch gearbox can be enhanced.

With a drivetrain of the described type, conventional operation is possible in which only the drive engine is active but the electric machine is not connected to the drivetrain or is concomitantly cranked. A hybrid operating mode is also possible in which the drive power is provided both by the drive engine and also by the electric machine. Finally, purely electric driving is also possible in which the internal combustion engine is shut down (that is to say, in general, is at a standstill). Here, the friction clutches of the dual-clutch gearbox are generally open in order that the drive engine (generally an internal combustion engine) need not be concomitantly cranked.

In the purely electric driving mode, the conventional shift sequences of a dual-clutch gearbox cannot be used because the electric machine is situated on the secondary side of the associated friction clutch.

Document DE 10 2010 044 618 A1 discloses methods for controlling a hybrid drivetrain during purely electric driving operation. Here, an electric machine is connected downstream of a clutch of a dual-clutch gearbox in the power flow direction, such that electric driving operation can be realized by means of the gear stages of the associated component gearbox. Here, in the event of gear changes, traction force assistance can be achieved in the following way.

In a first variant, the internal combustion engine is cranked, without being fired, by virtue of one or the other clutch being closed. During the gear change (upshift), via the other clutch, a traction force assistance torque is provided which utilises the inertial energy of the then coasting-down internal combustion engine. Here, a gear stage change may also take place in the component gearbox assigned to the other clutch in order to crank the internal combustion engine with a suitable gear stage and provide the traction force assistance torque with a different gear stage.

In a second variant, an overrun force assistance torque can be provided during downshifts by means of similar steps, wherein here, the internal combustion engine is not cranked up to speed but rather is used, at a standstill, as a drag load. Here, the overrun force assistance torque should be regulated such that the internal combustion engine is not set in rotation, that is to say a torque exerted on the internal combustion engine remains below a so-called breakaway torque.

SUMMARY

Against this background, it is an object of the invention to specify improved methods for controlling a hybrid drivetrain in which an electric machine is connected downstream of a clutch of a dual-clutch gearbox.

In the case of the method specified in the introduction, the above object is achieved, according to one aspect of the invention, in that the fill-in torque is provided from the inertial energy of the previously cranked, non-fired drive engine, wherein the drivetrain also has an electric starter motor, and wherein the starter motor is used to crank the drive engine.

In conventional drivetrains with an internal combustion engine, it is known, for the purpose of starting the internal combustion engine, to provide an electric starter motor which can crank the internal combustion engine up to a rotational speed at which the internal combustion engine can be fired (firing rotational speed of the internal combustion engine).

In hybrid drivetrains, it is generally sought to perform this starting process by means of the electric machine provided as a drive machine, in order thereby to save on the installation space and weight of a starter motor. In the case of the hybrid drivetrain to which the present invention relates, this is for example possible by virtue of the first friction clutch being opened and the second component gearbox being shifted into neutral, such that the drive power from the electric machine can be supplied via the second friction clutch to the internal combustion engine in order to start the latter.

In the case of the first aspect of the present invention, however, a starter motor of said type, in particular in the form of an electric starter motor, is provided in addition to the electric machine which serves as a drive machine.

In this way, it is possible for the drive engine with the associated starter motor to be produced in larger unit quantities, because it is not necessary to provide variants with and without a starter motor. Consequently, one variant of the hybrid drivetrain may also be provided in the form of a drivetrain powered purely by internal combustion engine. In other words, the provision of a hybrid drivetrain may constitute an additional option for a conventional drivetrain with internal combustion engine/starter motor.

It is advantageous for the starter motor to be used for the cranking of the drive engine purpose instead of the electric machine.

The object is thus achieved in its entirety.

It is generally possible to use the starter motor to crank the internal combustion engine fully up to the rotational speed required for building up the required inertial energy which is later to be provided in the form of a fill-in torque. Starter motors, however, generally have a limited rotational speed range, such that is not possible therewith to achieve any desired rotational speeds.

In one particularly preferred variant, the starter motor is consequently used (only) to overcome a breakaway torque during the cranking of the drive engine, wherein the drive engine is subsequently cranked up to a target rotational speed by means of the first or by means of the second power transmission path.

During the cranking of an internal combustion engine, it is firstly necessary to overcome a so-called breakaway torque which is higher than the drive torque that must subsequently be imparted.

Through the use of the starter motor for overcoming the breakaway torque, the electric machine, which is intended to compensate said torque in order to prevent interruptions in traction force or jerks, can be relieved of load.

Consequently, during said control process, the electric machine need merely provide the inertia torque, the losses and an acceleration torque, such that more torque can be conducted to the drive output.

In a further preferred embodiment which, in conjunction with the method specified in the introduction or with the preamble of Claim 1, constitutes an independent invention according to a second aspect, the fill-in torque is provided from the inertial energy of the previously cranked, non-fired drive engine, wherein the cranking process is realized by means of the first power transmission path, and wherein, before the cranking process, a high gear stage is engaged in the first component gearbox, in particular the highest or second-highest gear stage of the second component gearbox.

As a result of the engagement of a high gear stage, the torque that the electric machine must impart for torque compensation is reduced.

It is generally also possible to combine this method with the use of the starter motor. Furthermore, it is also possible to carry out a gear change in the first power transmission path before the fill-in torque is provided.

For example, it is also possible for the breakaway torque to initially be overcome in a high gear stage and for a shift to a lower gear stage to subsequently be performed in the first power transmission path in order to be able to crank the drive engine up to a higher rotational speed. In this way, the inertial energy can be increased, such that more time is available for the gear change in the second power transmission path, because fill-in torque can be provided from the inertial energy over a longer period of time.

In a further preferred embodiment which, in combination with the method specified in the introduction or with the preamble of Claim 1, constitutes an independent invention according to a third aspect, the fill-in torque is provided from a torque of the electric machine, wherein both the first friction clutch and also the second friction clutch are closed at least in sections and/or at least partially in order to transmit fill-in torque of the electric machine via the first power transmission path, and wherein the drive engine is concomitantly cranked in the process.

In this embodiment, the drive engine is not fired. Consequently, it is necessary for the electric machine to provide a torque which includes not only the fill-in torque but also the torque required to concomitantly crank the drive engine.

This embodiment, too, may be combined with the variant in which the starter motor is used for overcoming a breakaway torque.

In the case of this aspect of the invention, it is preferable if, for the provision of fill-in torque, firstly the first friction clutch is closed, preferably completely closed, and subsequently the second friction clutch is closed to such an extent that torque equilibrium is produced by means of the second friction clutch, such that a starting gear in the second component gearbox can be disengaged.

After the closure of the first friction clutch, said first friction clutch transmits the torque of the electric machine minus the drag torque of the drive engine. It is self-evident that, prior to this, a gear stage must be engaged in the first component gearbox.

According to a further aspect of the present invention, the above object is achieved by means of a method for controlling a hybrid drivetrain of the type mentioned in the introduction, as per the preamble of Claim 1, wherein a fill-in torque is provided from a drive torque of the drive engine which is briefly fired for the gear change.

In the case of this aspect of the invention, the drive engine is consequently not cranked without being fired in order to build up inertial energy. Rather, the drive engine, which in this case is in the form of an internal combustion engine, is cranked up to a rotational speed above the firing rotational speed, and is subsequently fired such that the internal combustion engine can provide internal combustion engine drive torque which is used as fill-in torque. Here, the drive engine is shut down again immediately after the end of the gear change.

Here, it is particularly preferable if the drive engine is firstly cranked up to speed and fired by virtue of the first or the second friction clutch being closed, wherein the fill-in torque is subsequently provided via the first power transmission path.

It is preferable here for the process of cranking up to speed to take place by virtue of the second friction clutch being closed, such that the torque that must be imparted by the electric machine for this purpose can be provided directly from the second power transmission path.

In a further preferred embodiment, it is provided here that the second friction clutch is opened before the disengagement of a starting gear, wherein this preferably takes place in a manner synchronised with a run-down of the torque of the electric machine to zero.

In a further preferred embodiment of this aspect, the torque provided by the electric machine is briefly increased in order to initially overcome a breakaway torque of the stopped drive engine.

The electric machine may preferably then also continue to be used to crank the drive engine up to a firing rotational speed.

In a further preferred embodiment, the drivetrain also has an electric starter motor, wherein the starter motor is used at least for overcoming a breakaway torque of the stopped drive engine.

It is preferable for the starter motor to also be used to crank the internal combustion engine up to the firing rotational speed.

In general, the methods specified above may be used to provide a fill-in torque in the form of a traction force assistance torque during a traction upshift.

In the same way, it is possible with the above methods to provide a fill-in torque in the form of a traction force assistance torque during a traction downshift.

In general, with the method according to invention, it is possible to carry out a gear change during purely electric driving operation, wherein at least the quality of assisted gear changes by means of automated shift gearboxes ("AST") is attained. The overall shift time for such a gear change is preferably similar to that of a conventional shift of a dual-clutch gearbox (with torque transfer from one power transmission path to the other).

Overall, with a hybrid drivetrain of said type, improved acceleration values, increased comfort and improved dynamics are attained. As a result of the higher torque that prevails for longer at the drive output, subjectively shorter shift times are attained.

It is self-evident that the features mentioned above and the features yet to be explained below may be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and will be explained in more detail in the following description, in which.

DETAILED DESCRIPTION OF PREFERRED EMBODIMENTS

Figure 1:
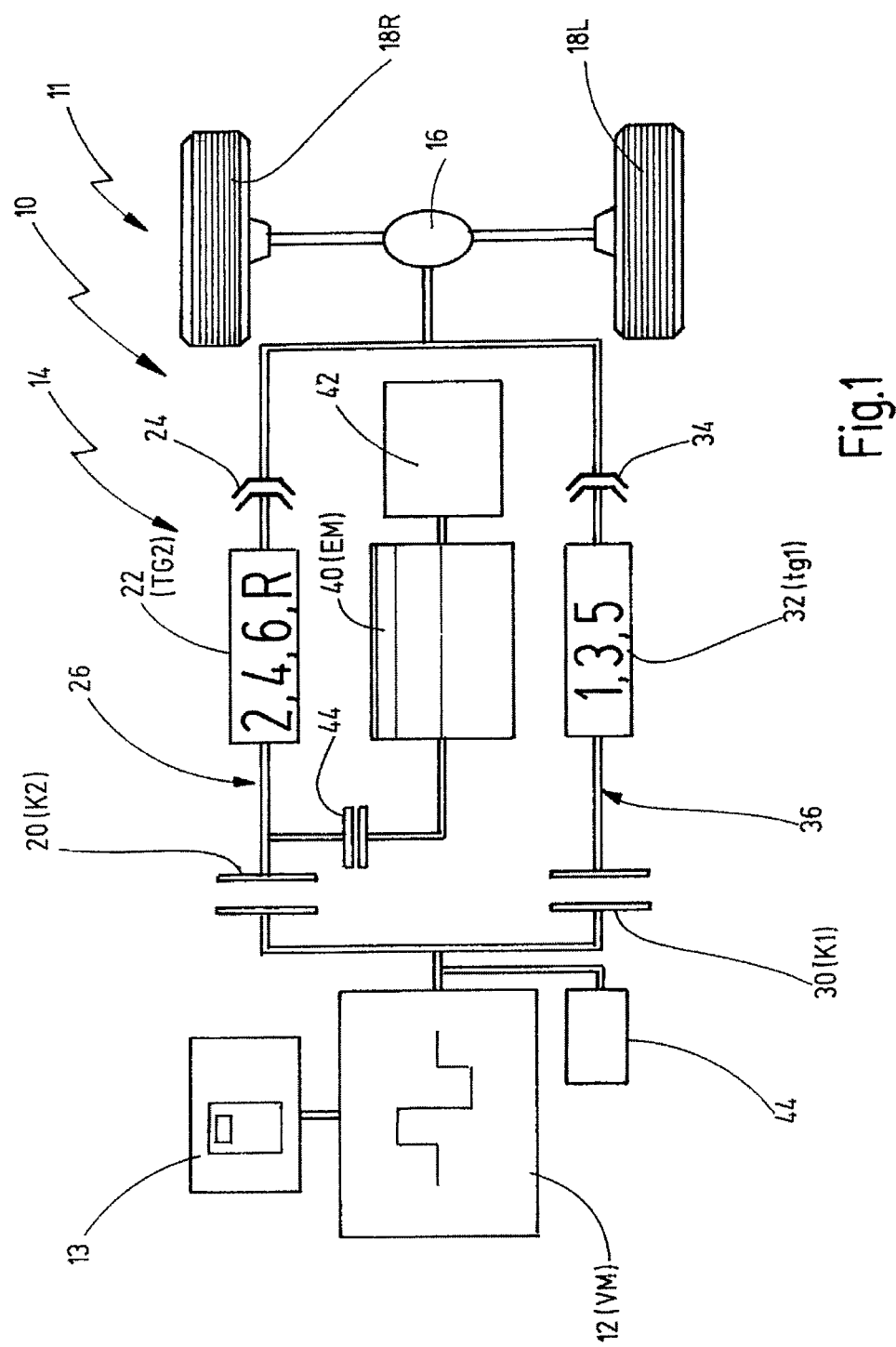
FIG. 1 is a schematic illustration of a first embodiment of a hybrid drivetrain for carrying out the method according to invention.

In FIG. 1, a drivetrain for a motor vehicle 11 is denoted generally by 10. The motor vehicle 11 may be for example a passenger motor vehicle.

The drivetrain 10 comprises a drive engine 12, for example in the form of an internal combustion engine, which is supplied from an energy store such as a fuel tank 13. Furthermore, the drivetrain 10 comprises a dual-clutch gearbox (DKG) 14, the drive output side of which is connected to a differential 16. The differential 16 distributes drive power between a left-hand and a right-hand driven wheel 18L, 18R.

The dual-clutch gearbox 14 comprises a first friction clutch 30 (K1) and a first component gearbox 32. The first component gearbox 32 comprises for example the odd-numbered gear stages 1, 3, 5, etc., which can be engaged and disengaged by means of associated shift clutches 34. The first friction clutch 30 (K1) and the first component gearbox 32 (TG1) form a first power transmission path 36 for the transmission of drive power from the drive engine 12 to the differential 16.

The dual-clutch gearbox 14 also comprises a second friction clutch 20 (K2) and a second component gearbox 22 (TG2). The second component gearbox 22 comprises for example gear stages 2, 4, 6, R, which can be engaged and disengaged by means of schematically indicated shift clutches 24. The second friction clutch 20 and the second component gearbox 22 form a second power transmission path 26 for transmitting power from the drive engine 12 to the differential 16.

Furthermore, the drivetrain 10 comprises an electric machine (EM) 40 which is connected to an arrangement 42 for control and for supply of energy. The arrangement 42 may for example comprise power electronics and a battery.

The electric machine 40 is fixedly connected to an input of the second component gearbox 22, for example via a spur gear set or the like. Alternatively, the electric machine 40 may be connected to the input of the second component gearbox 22 by means of a coupling arrangement 46 (for example in the form of a shift clutch).

In an alternative variant which is not illustrated, the electric machine 14 may also alternatively be connected to the input of the first component gearbox 32, for which purpose a suitable coupling device may be provided.

The connection of the electric machine 42 to that component gearbox which has the highest gear stage and the reverse gear stage permits electric driving in virtually all operating situations, as will be explained in yet more detail below.

The drivetrain 10 is configured to operate in three different operating modes. In a conventional drive mode, the drive power is generated only by the drive engine 12 (internal combustion engine, ICE). Gear changes take place without an interruption in traction force by virtue of drive power being conducted via one of the power transmission paths 26, 36, wherein a gear stage is preselected in the component gearbox of the other power transmission path. Subsequently, a gear change takes place by means of a transfer of the power transmission flow from one path to the other path by virtue of the friction clutches 20, 30 being actuated in an overlapping manner. Said drive mode is generally known in the field of dual-clutch gearboxes.

It is also possible to implement a second, hybrid drive mode in which drive power is provided both by the drive engine 12 and also by the electric machine 40. Here, the drive powers can be substantially added up at the summing point at the input of the second component gearbox 22 (or downstream of the second friction clutch 22 in the power flow direction). A further possibility for a hybrid drive mode consists in that drive power is transmitted from the electric machine via one component gearbox and drive power is transmitted from the internal combustion engine via the other component gearbox, wherein a summing point is then situated at the differential. In the second hybrid drive mode, the electric machine may provide either a positive or a negative torque (boost operation or load-point elevation/charging).

Finally, a third drive mode is possible in which only the electric machine 40 is controlled so as to generate drive power, whereas the drive engine 12 is shut down. Since the electric machine 40 is connected to the secondary side of the second friction clutch 20, it is not possible in this operating mode for the conventional shift sequences of a dual-clutch gearbox to be implemented.

In general, however, it is desirable, during purely electric forward driving operation, to perform gear changes from the forward gear stage 2 into the forward gear stage 4, and if appropriate into the forward gear stage 6, and vice versa.

During purely electric driving operation, drive power is supplied from the electric machine via the second component gearbox 22 to the differential 16. The second friction clutch 20 is generally open. To perform a traction upshift, for example, the torque provided by the electric machine 40 must be reduced in order to disengage a starting gear. Here, during the engagement of the target gear stage, too, no torque is provided by the electric machine 40, because otherwise it may not be possible for synchronisation to take place at the shift clutch 24.

Accordingly, in the case of conventional hybrid drivetrains, said type of gear change can be carried out in purely electric driving operation only with an interruption in traction force.

To alleviate this problem, the following methods will be explained.

All of the methods described below assume that the vehicle is travelling in the purely electric operating mode and that an automated shift is to be performed by means of the drivetrain of FIG. 1, wherein the shift is either a traction upshift or a traction downshift. The following diagrams all relate to traction upshifts. Said illustrations however apply in a corresponding manner to traction downshifts.

In particular, the following methods assume that a traction upshift takes place from the gear stage 2 to the gear stage 4, wherein said two gear stages are situated in the second component gearbox 22 (TG2).

In the following diagrams with respect to time, n_ICE shows the rotational speed of the internal combustion engine, n_EM shows the rotational speed of the electric machine, n_TG1 shows the rotational speed at the input of the first component gearbox 32, n_TG2 shows the rotational speed at the input of the second component gearbox. Here, the rotational speeds n_EM and n_TG2 are identical or proportional because the electric machine 40 is in this case fixedly coupled to the input of the second component gearbox 22 (TG2) or to the output of the second friction clutch 20 (K2).

Furthermore, in the following diagrams with respect to time, the respective torques are shown as follows: tq_ICE is the torque of the internal combustion engine, tq_EM is the torque of the electric machine, tq_K1 is the torque transmitted by the first friction clutch 30 (K1), tq_K2 is the torque transmitted by the second friction clutch 20 (K2).

Also shown in the diagrams with respect to time are the gear changes, wherein these are shown in the respective component gearboxes TG1, TG2, wherein G stands for gear stage and wherein N stands for the neutral position. Furthermore, the diagrams with respect to time described below are partially normalised with respect to rotational speed and with respect to torque, such that the different transmission ratios are factored out in order to make the sequences clearer. This applies in particular to the diagram with respect to time in FIG. 5.

Figure 2:
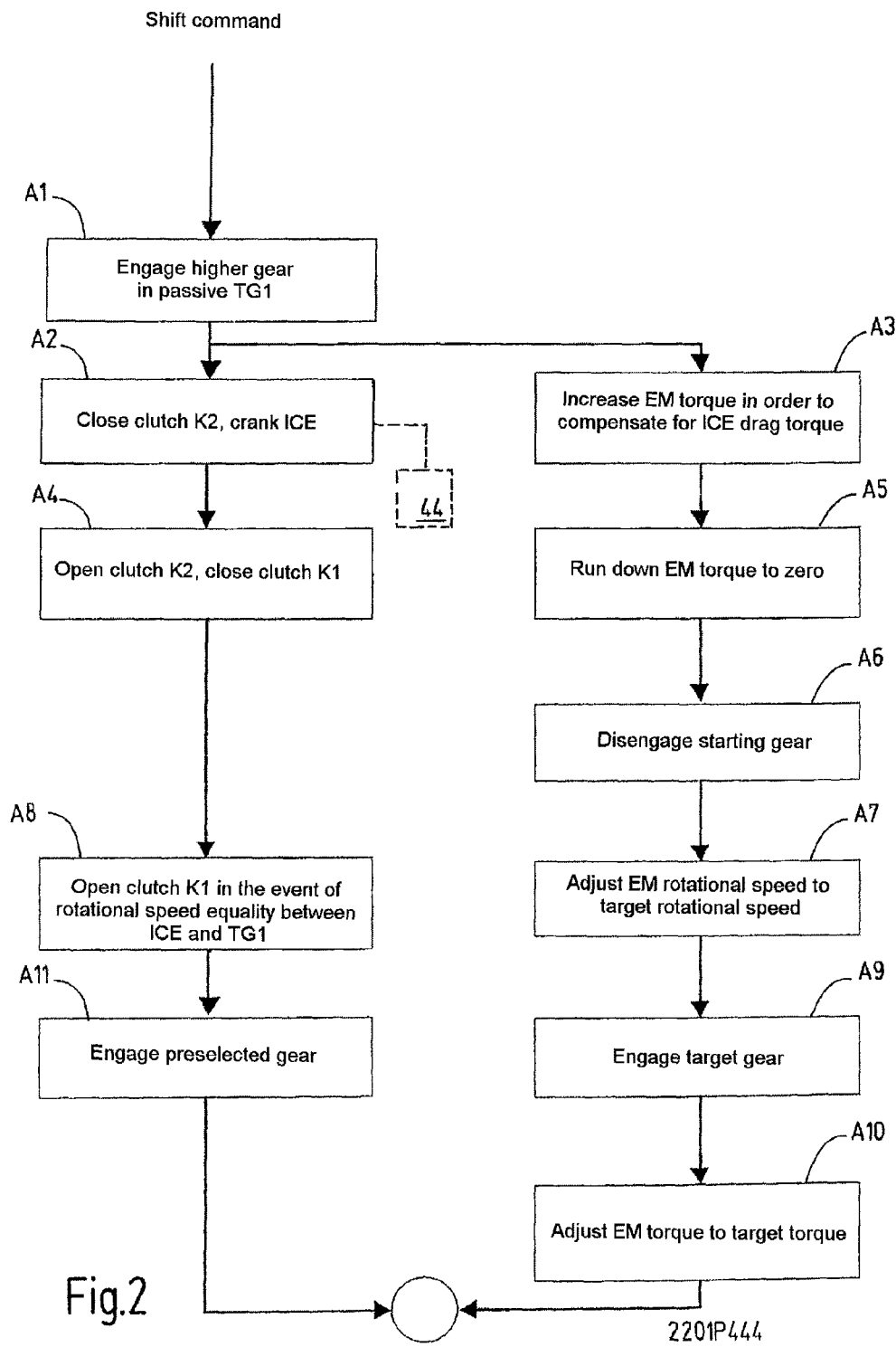
FIG. 2 is a flow diagram of an embodiment of a gear change in the purely electric driving mode with traction force assistance.
Figure 3:
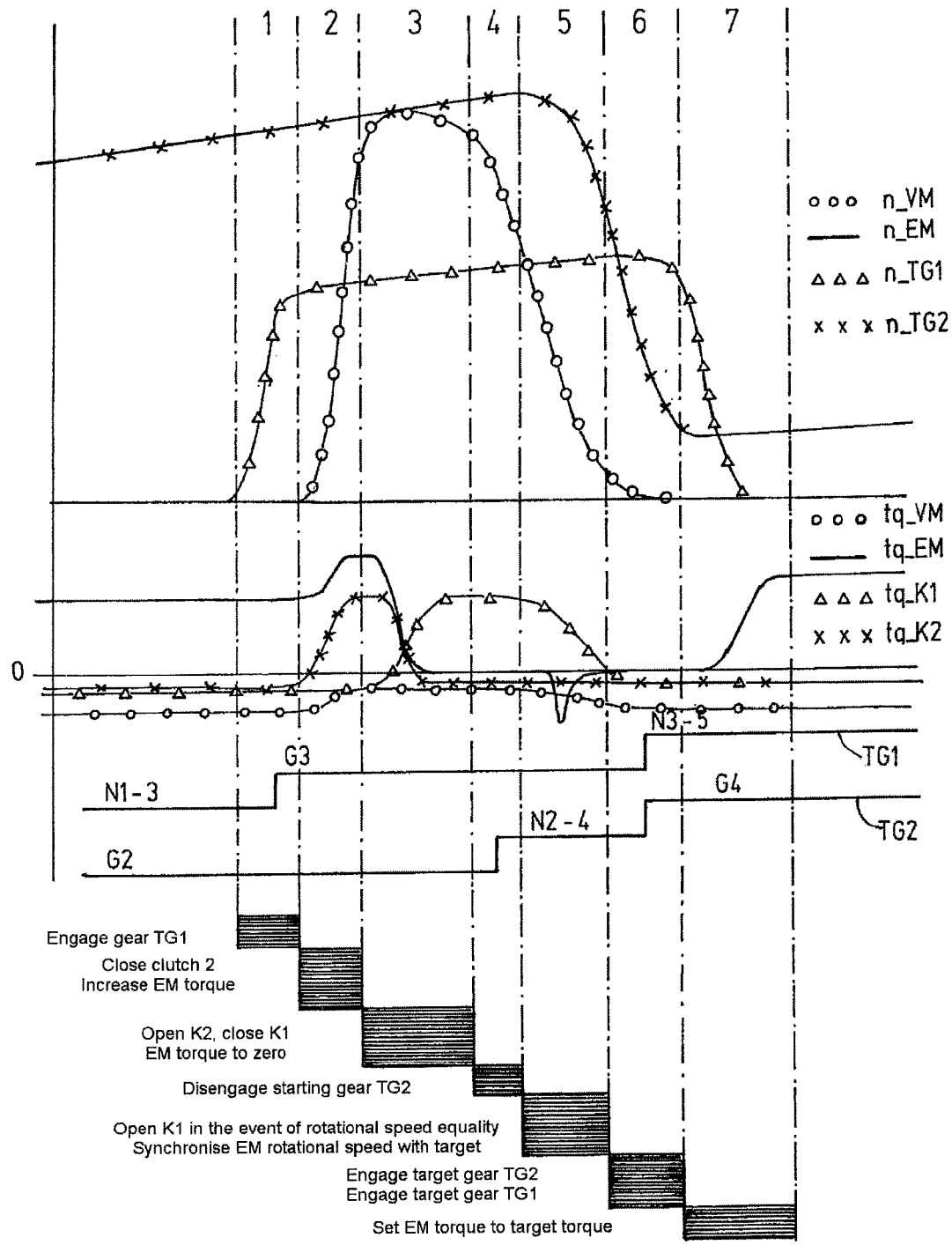
FIG. 3 shows a diagram with respect to time of rotational speeds and torques for explaining the gear change of FIG. 2.

A first embodiment of a method according to the invention is shown in FIGS. 2 and 3. Here, FIG. 2 shows a flow or sequence diagram, and FIG. 3 shows a diagram with respect to time of rotational speeds and torques and shift processes in the drivetrain.

In said method according to FIGS. 2 and 3, in a first step (phase 1 in FIG. 3 and step A1 in FIG. 2), it is firstly the case that, in the first component gearbox 1 (passive component gearbox), the highest possible gear stage (gear stage 3 or 5) is engaged proceeding from the neutral position.

In the subsequent phase 2 of FIG. 3, the clutch K2 is closed, such that the internal combustion engine is cranked without being fired (A2). In parallel with this, in step A3, the torque of the electric machine is increased in order to compensate for the drag torque of the internal combustion engine.

It is shown in FIG. 2 that, during the step A2, the turning-over or cranking of the internal combustion engine may take place by means of the clutch K2. If the drivetrain has a starter motor 44, said turning-over may however also take place by means of the starter motor 44.

In phase 3 of FIG. 3, the rotational speed of the internal combustion engine has reached the target rotational speed, such that the clutch K2 can subsequently be opened (A4 in FIG. 2), and the torque of the electric machine can be run down. If the starter motor 44 was used for cranking the internal combustion engine, the clutch K2 has not necessarily been closed, and consequently also need not necessarily be opened again.

As a result of the closure of the clutch K1 in phase 3 up to and including phase 5 of FIG. 3, a fill-in torque is provided, by means of the inertial energy of the coasting-down internal combustion engine, via the first power transmission path 36.

In the first power transmission path 36, with the clutch K2 open, the starting gear of the gear change must then be disengaged in step A6 (phase 4 in FIG. 3). Subsequently, the rotational speed of the electric machine 40 must be adapted (phase 5 in FIG. 3). When rotational speed equality is attained (phase 6 in FIG. 3 and step A8 in FIG. 2), the target gear of the gear change can be engaged (in phase 6 of FIG. 3 and in step A9, the target gear is gear stage 4).

Subsequently, as is the case during a conventional gear change, the torque of the electric machine 40 can be increased again to a target torque (phase 7 in FIG. 3 and step A10). Furthermore, in phases 6 or 7, a preselected gear may already be engaged in the first component gearbox TG1 if required.

The method of FIG. 2 is consequently based on the provision of a fill-in torque by virtue of the internal combustion engine being not fired but initially cranked in order that its inertial energy can be utilised for providing a fill-in torque. Here, by contrast to the method of document DE 10 2010 044 618 A1, a relatively high gear stage is engaged (in the present case the gear stage 3 or 5 and not the gear stage 1), which is the second-highest or highest gear stage. In this way, the torque that the electric machine 40 must impart in order to compensate for the drag torque may be lower, such that more torque can be provided for driving the motor vehicle in phases 1 and 2 and, in part, in phase 3.

In the alternative variant, in which the starter motor 44 is used for cranking the internal combustion engine or at least for overcoming a breakaway torque, it is generally possible during said phases for a higher torque to be provided by the electric machine for driving the motor vehicle.

Figure 4:
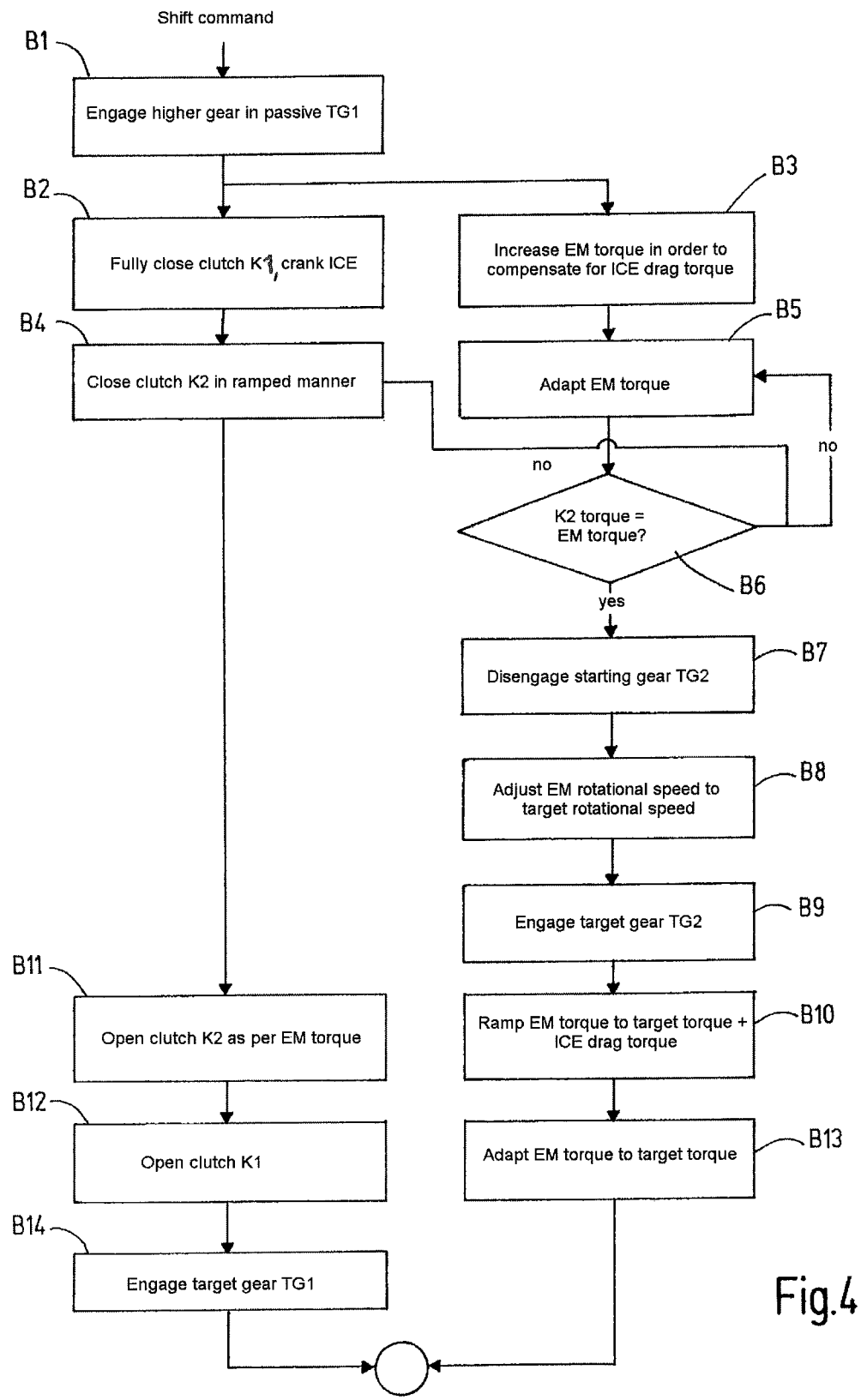
FIG. 4 shows a flow diagram of a further embodiment of a gear change in the purely electric driving mode with traction force assistance.
Figure 5:
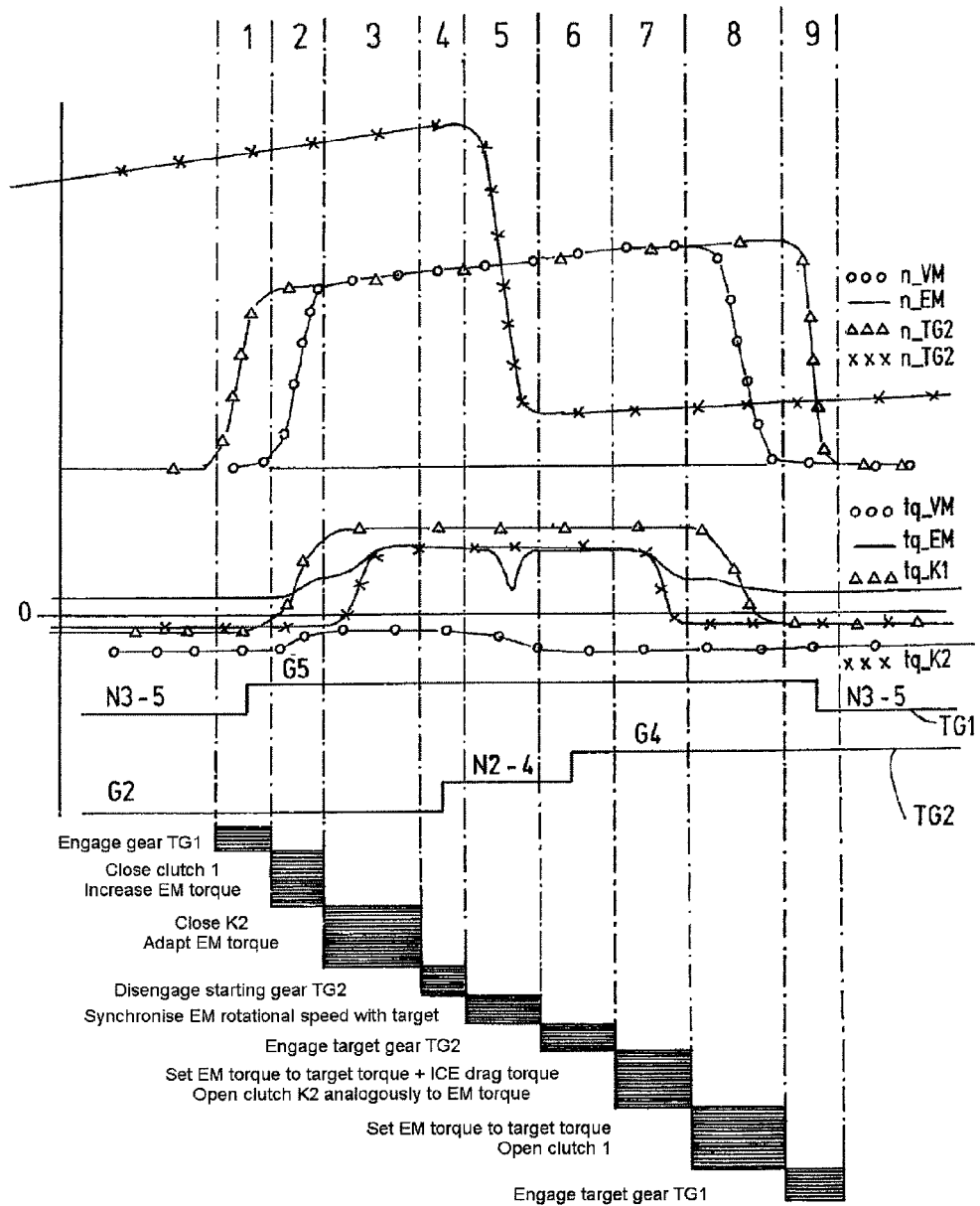
FIG. 5 shows a diagram with respect to time of rotational speeds and torques for explaining the gear change of FIG. 4.

A further embodiment of a method according to invention is illustrated in FIGS. 4 and 5.

In said method, a fill-in torque is provided by the electric machine 40, wherein said fill-in torque is conducted via the second friction clutch 20 and via the first friction clutch 30 to the first power transmission path 36. Here, the drive engine 12 is positively concomitantly cranked, such that said concomitant cranking torque must likewise be compensated for. As an alternative to this, it is conceivable for a third friction clutch to be provided between the friction clutches 20, 30, which third friction clutch decouples the drive engine 12 from the dual-clutch gearbox 14. In this case, a concomitant cranking torque of said type need not be overcome because said clutch can be opened in this case.

The method initially starts with the engagement of a higher gear stage (for example gear stage 5) in the component gearbox 1 (step B1 in FIG. 4, phase 1 in FIG. 5).

In the subsequent steps B2, B3 (phase 2 in FIG. 5), the clutch K1 is fully closed such that the drive engine 12 is cranked. This may in turn be realized alternatively by means of a starter motor 44 (if a starter motor of said type is provided in the drivetrain).

To compensate for the drag torque, the torque of the electric machine is increased in this phase.

In the subsequent phase 3 of FIG. 5 (steps B4, B5 in FIG. 4), the second friction clutch 20 (K2) is closed in a ramped manner such that the electric machine 40 transfers torque via the second friction clutch 20 and the first friction clutch 30 into the first power transmission path 36. Here, the torque of the electric machine 40 must consequently be adapted.

When the torque across the second friction clutch 20 is equal to the torque provided by the electric machine 40 (in phase 3 of FIG. 5), the second power transmission path 26 is consequently free from load.

Accordingly, in steps B7 to B9 of FIG. 4 (phases 4 to 6 in FIG. 5), the gear change from the starting gear (G2) into the target gear (G4) of the component gearbox 2 can take place.

In the subsequent steps B11, B10 (phase 7 in FIG. 5), the second friction clutch 20 is opened again, specifically in a manner corresponding to the torque provided by the electric machine, said torque being adjusted to a target torque taking into consideration the drag torque of the drive engine 12.

In phase 8, the first friction clutch 30 can be opened (step B12 in FIG. 4), and in parallel with this, the torque of the electric machine 40 can be adjusted to a target torque (step B13).

Subsequently, in step B14, a target gear stage can be engaged in the first component gearbox, or else a shift into a neutral position may take place, as shown in phase 9 of FIG. 5.

Figure 6:
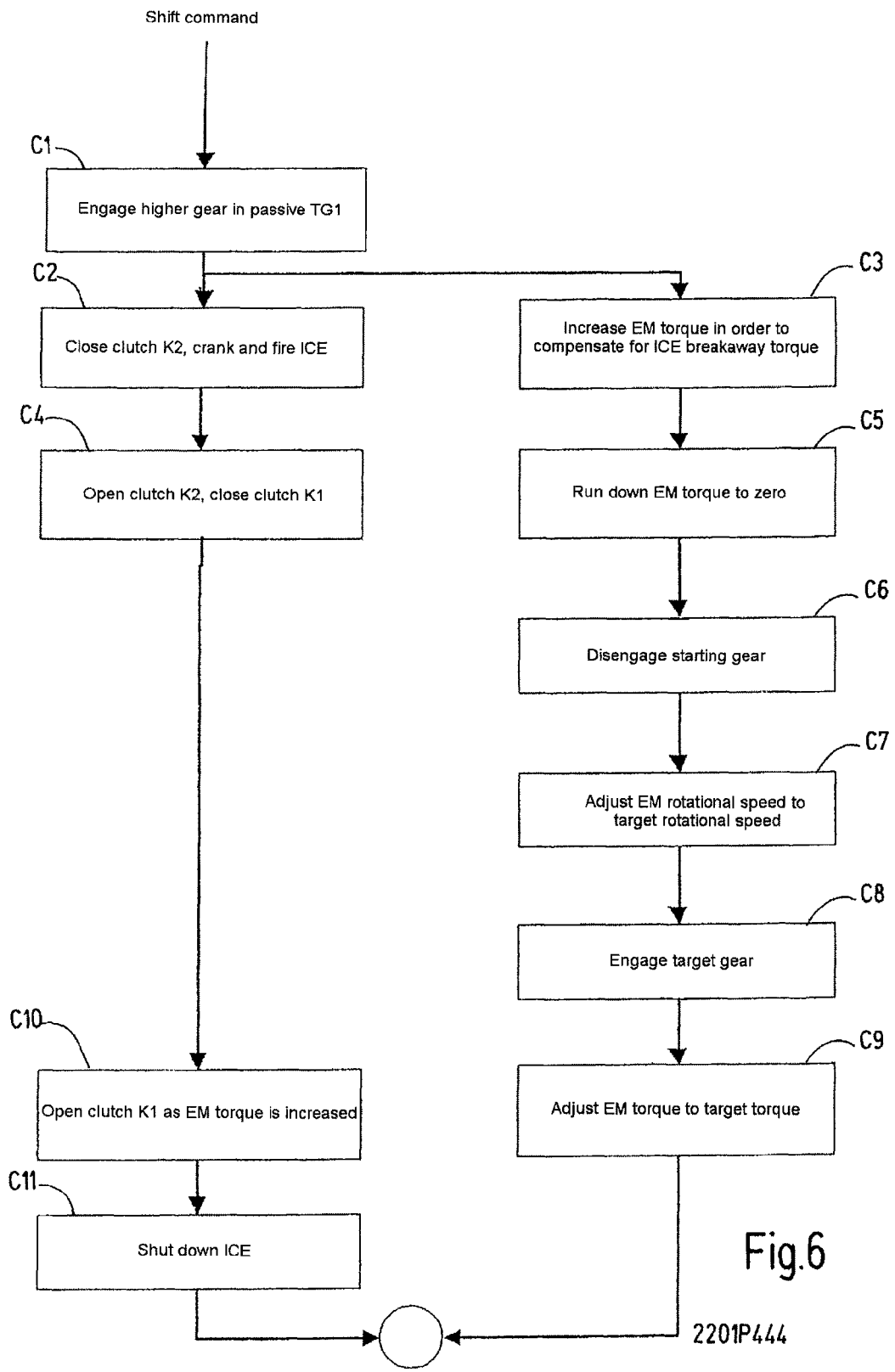
FIG. 6 shows a flow diagram of a further embodiment of a gear change in the purely electric driving mode with traction force assistance.
Figure 7:
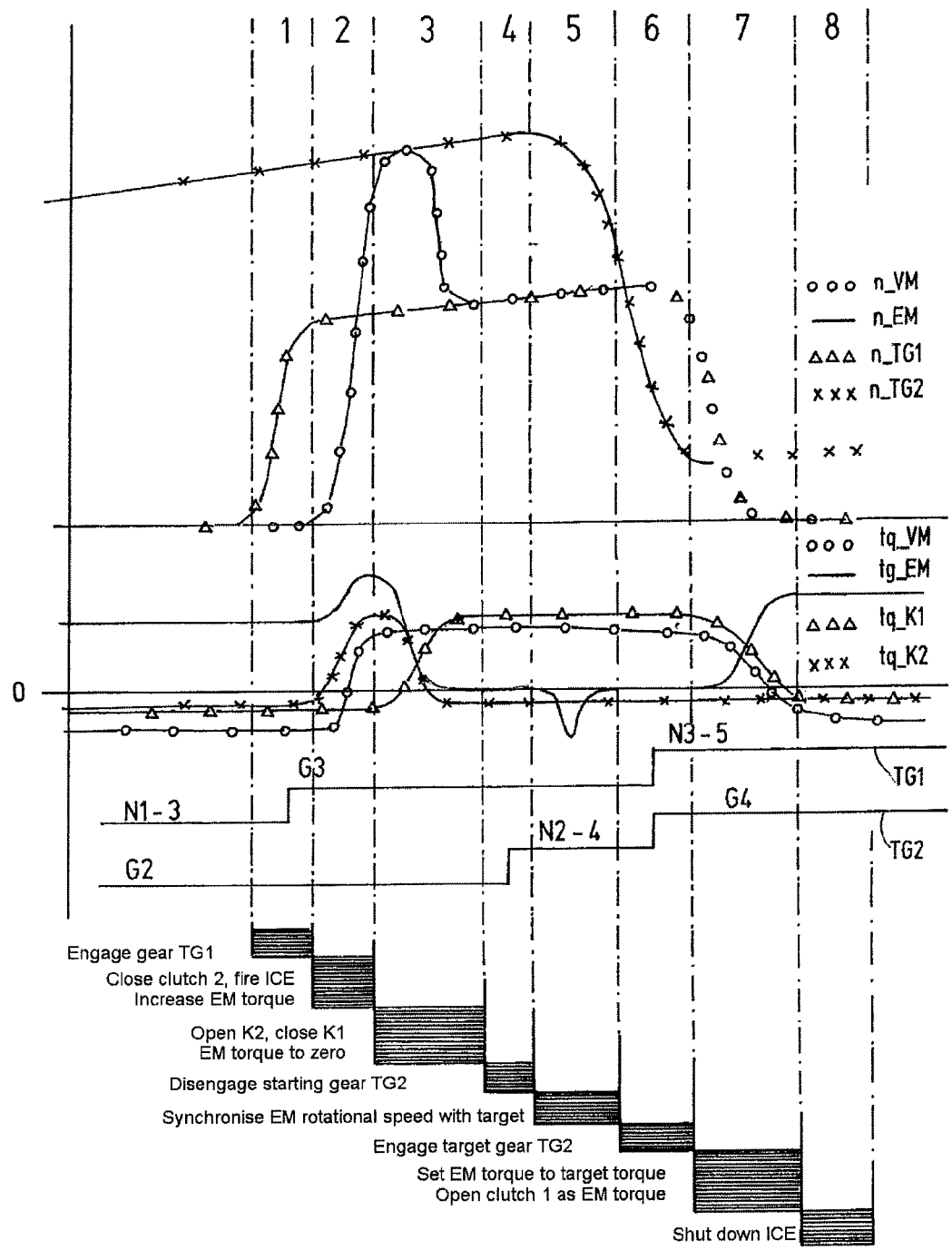
FIG. 7 shows a diagram with respect to time of rotational speeds and torques for explaining the gear change of FIG. 6.

FIGS. 6 and 7 show a further embodiment of a method according to the invention, in which the drive engine is in the form of an internal combustion engine and said drive engine is not only cranked but is also fired in order to provide a fill-in torque by means of the fired internal combustion engine.

Firstly, in step C1, a higher gear stage is engaged in the first component gearbox 32 (G3 in phase 1 of FIG. 7).

Subsequently, the second friction clutch K2 is closed, such that the internal combustion engine is cranked up to speed (phase 2 in FIG. 7 and step C2 in FIG. 6). During said cranking process, the torque of the electric machine 40 is increased in order to compensate for the drag torque and breakaway torque of the internal combustion engine (step C3).

When the internal combustion engine is fired (in phase 3), the second friction clutch 20 is opened and the first friction clutch 30 is closed. Then, via the first power transmission path 36, fill-in torque is provided by means of the internal combustion engine. In the second power transmission path 26, the torque of the electric machine 40 can be run down (step C5), and the gear change can take place in the conventional manner (steps C6 to C8, phases 4 to 6 of FIG. 7).

Subsequently, in step C10, the first friction clutch is opened again, and in parallel therewith, the torque of the electric machine 40 is increased (C9, phase 7 in FIG. 7).

In step C11, the internal combustion engine can then be shut down again.

The duration for which the internal combustion engine is fired is in this case restricted to the time period of the gear change, and may in particular be shorter than one second, in particular shorter than half of one second.

Figure 8:
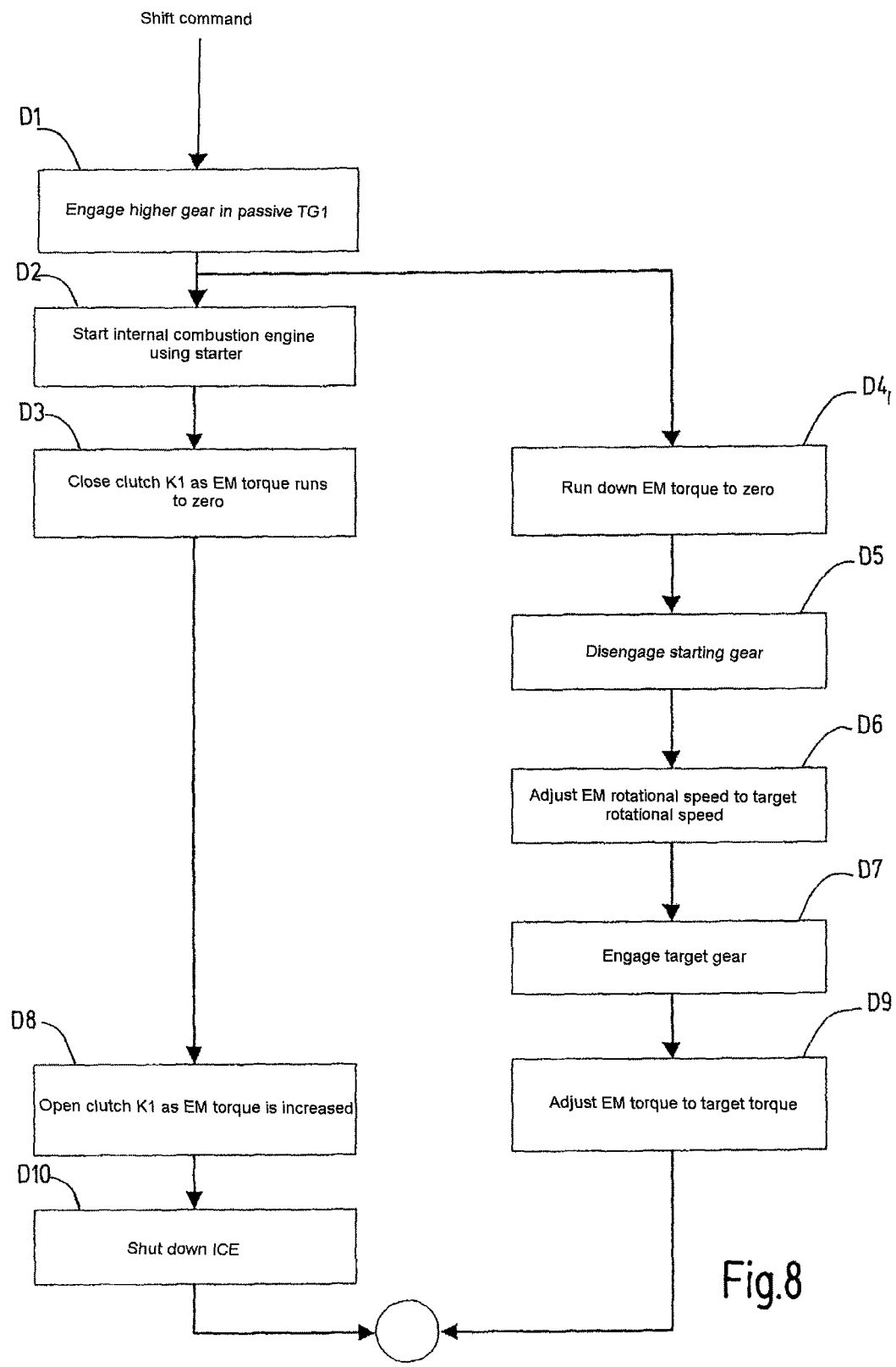
FIG. 8 shows a flow diagram of a further embodiment of a gear change in the purely electric driving mode with traction force assistance.
Figure 9:
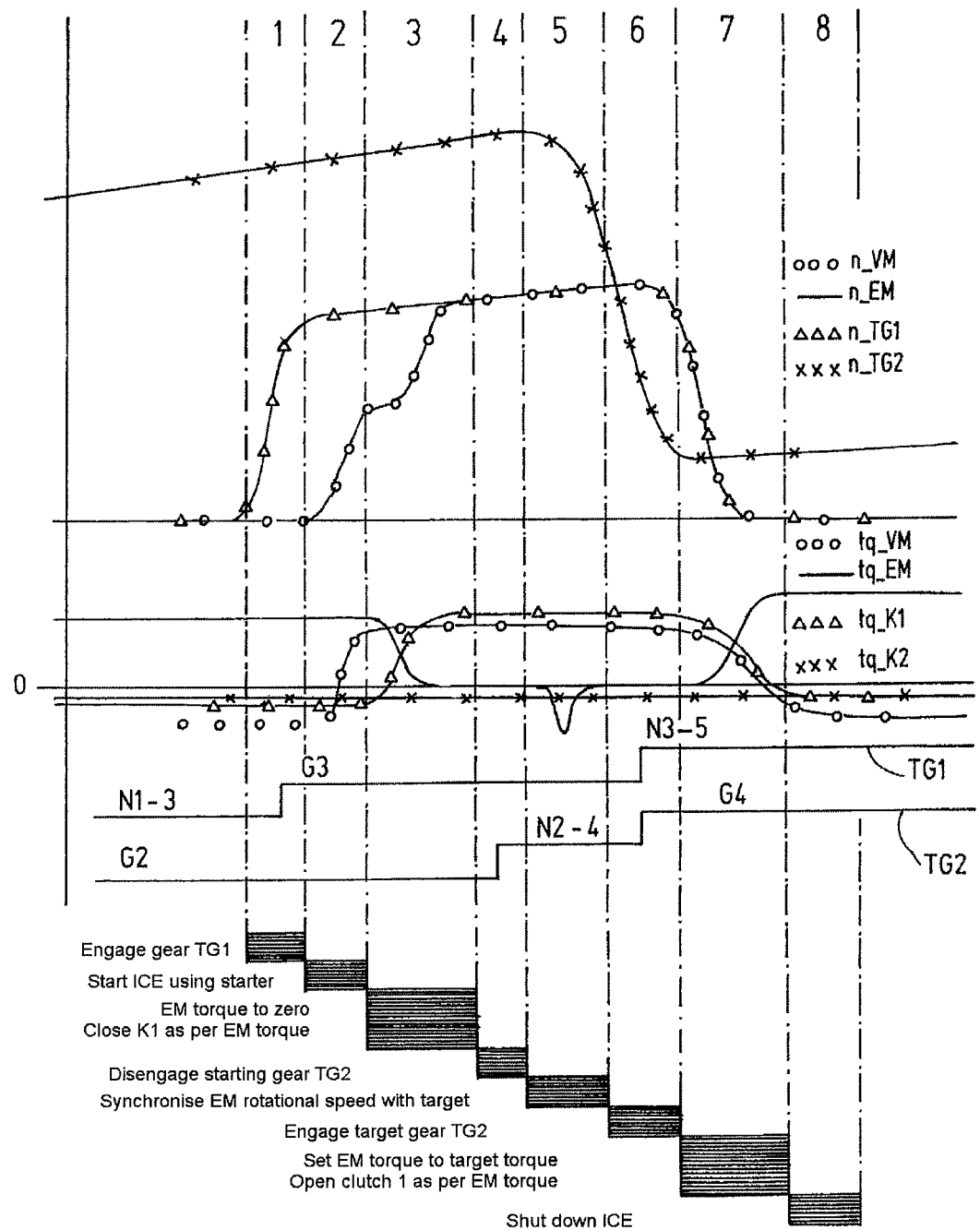
FIG. 9 shows a diagram with respect to time of rotational speeds and torques for explaining the gear change of FIG. 8.

FIGS. 8 and 9 show a further embodiment of a method according to invention, which corresponds substantially to the method of FIGS. 6 and 7.

Here, however, the second friction clutch is not closed for speeding up the internal combustion engine until it reaches the firing rotational speed. Rather, in step D2, the internal combustion engine is started by means of a starter motor which, in this variant, is provided in the drivetrain.

After the starting process, the clutch K1 can be closed (step D3 corresponding to step C4 of FIG. 6). The steps D4 to D7 correspond to steps C5 to C8 of FIG. 6.

Steps D9 to D10 correspond to steps C9 to C11 of FIG. 6.

What is claimed is:

1. In a hybrid drivetrain which has a drive engine and a dual-clutch gearbox which, to establish a first and a second power transmission path, has a first and a second friction clutch and a first and a second component gearbox, wherein an electric machine is connected to the second power transmission path downstream of the second friction clutch in a power flow direction, wherein purely electric driving operation can be realized by means of the second component gearbox assigned to the second friction clutch, wherein the drivetrain also has an electric starter motor,
   a method for controlling the drivetrain comprises a step of
      providing a fill-in torque in an event of a gear change in the second component gearbox during purely electric driving operation, the fill-in torque being a traction force assistance torque,
   the fill-in torque being provided from inertial energy of the drive engine which has been previously cranked in a non-fired condition with the assistance of the starter motor.

2. Method according to claim 1, wherein the starter motor is used to overcome a breakaway torque during the cranking of the drive engine, wherein the drive engine is subsequently cranked up to a target rotational speed by means of the first or by means of the second power transmission path.

3. The method according to claim 1, wherein a cranking process is realized by means of the first power transmission path, and wherein, before the cranking process, a high gear stage is engaged in the first component gearbox.

4. The method according to claim 3, wherein the high gear stage is a highest or a second-highest gear stage of the first component gearbox.

5. Method according to claim 1, wherein the fill-in torque is provided from a torque of the electric machine, wherein both the first friction clutch and also the second friction clutch are at least one of closed at least in time-segments and at least partially in order to transmit fill-in torque of the electric machine via the first power transmission branch, and wherein the drive engine is concomitantly cranked in the process.

6. Method according to claim 5, wherein, for the provision of fill-in torque, firstly the first friction clutch is closed and subsequently the second friction clutch is closed to such an extent that torque equilibrium is produced by means of the second friction clutch, such that a starting gear in the second component gearbox can be disengaged.

7. The method according to claim 1, wherein the fill-in torque is a traction force assistance torque during a traction upshift.

8. The method according to claim 1, wherein the fill-in torque is a traction force assistance torque during a traction downshift.

* * * * *